United States Patent [19]

Doughty et al.

[11] Patent Number: 5,116,445

[45] Date of Patent: May 26, 1992

[54] METHOD FOR FORMING LOCATOR LUG

[75] Inventors: John I. Doughty, White Bear Lake; Darrell W. Blauer, Orono, both of Minn.

[73] Assignee: Douglas Corporation, Minneapolis, Minn.

[21] Appl. No.: 631,523

[22] Filed: Dec. 21, 1990

[51] Int. Cl.$^5$ ............................................. B29C 39/00
[52] U.S. Cl. ................................... 156/245; 156/245; 156/252; 156/253; 156/293; 264/135; 264/259; 425/135
[58] Field of Search ............... 156/252, 253, 293, 245; 425/135; 264/259, 135

[56] References Cited

U.S. PATENT DOCUMENTS

| | | | |
|---|---|---|---|
| 3,352,955 | 11/1967 | Pigott et al. | 264/135 |
| 4,240,852 | 12/1980 | Gomberg et al. | 264/135 |
| 4,247,510 | 1/1981 | Desverchere | 264/259 |
| 4,481,160 | 11/1984 | Bree | 264/135 |

Primary Examiner—David A. Simmons
Assistant Examiner—Merrick Dixon
Attorney, Agent, or Firm—Merchant, Gould, Smith, Edell, Welter & Schmidt

[57] ABSTRACT

A decorative emblem is formed having a front surface and an opposite back surface. A mold is placed against the back surface. Cavities in the mold are sized and shaped to conform to a desired shape of a locator lug. Flowable plastic is injected into the cavity and sets against the back surface of the emblem.

4 Claims, 1 Drawing Sheet

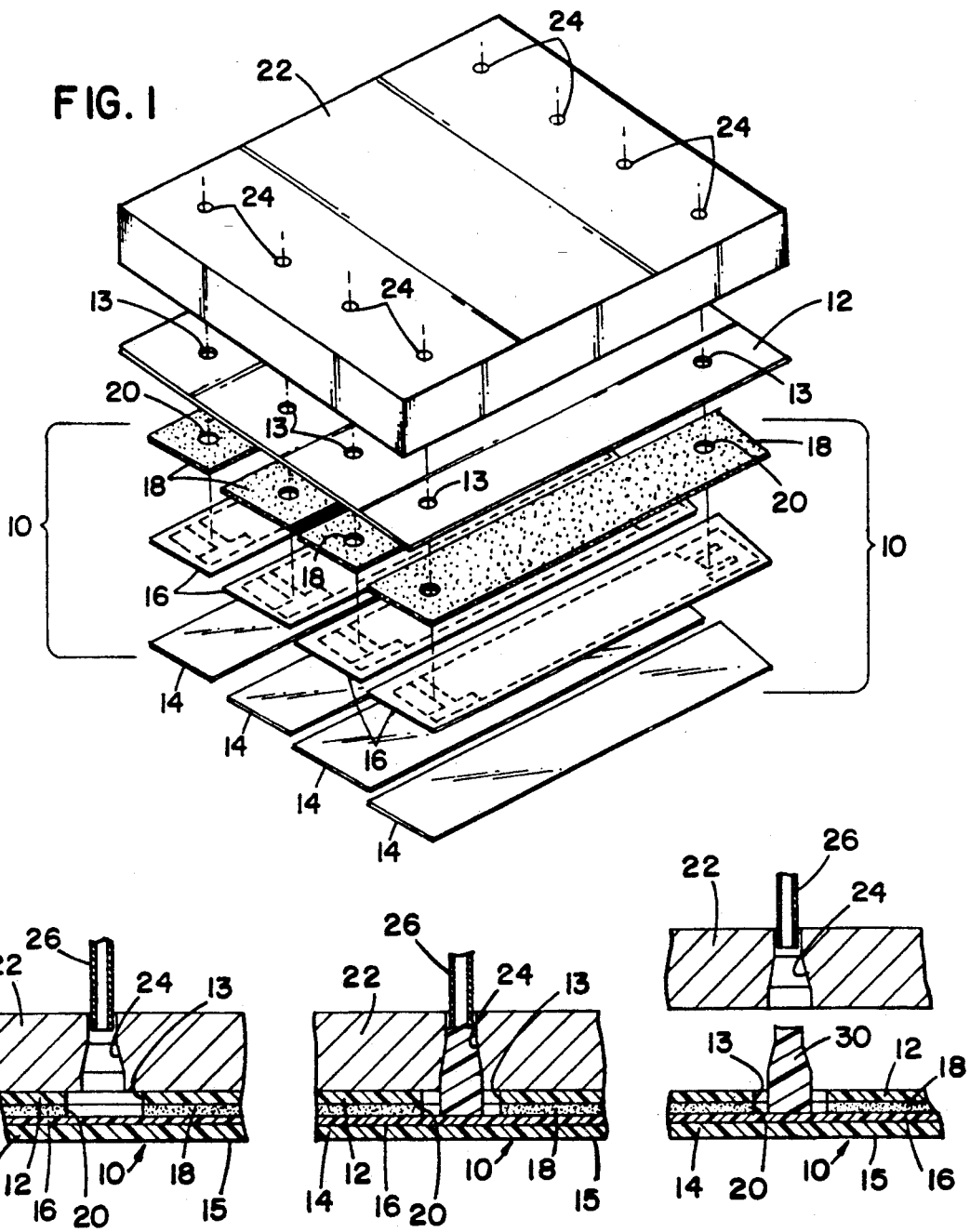
FIG. 1
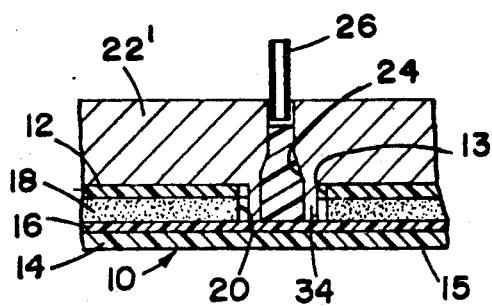
FIG. 2  FIG. 3  FIG. 4
FIG. 5

5,116,445

METHOD FOR FORMING LOCATOR LUG

BACKGROUND OF THE INVENTION

1. Field of the Invention

This invention relates to decorative emblems which are preferably for use in customizing product surfaces (e.g., automobile surfaces) and displaying a manufacturer's name or trademark on an automobile or other product. More particularly, this invention pertains to a method for fabricating such emblems with locator lugs to assure accurate alignment of the emblem on the product.

2. Description of the Prior Art

Decorative emblems for use on automobiles to signify a manufacturer's trademark are well known. Historically, such emblems were formed of rigid, injection-molded plastic. The rigid emblems included locator lugs which would be received within holes formed in the automobile body. Cooperation of the holes and lugs assured accurate positioning and alignment of the emblem. In addition to having locator lugs intricately cast with injection-molded plastic emblems, locator lugs could be cast into an article. For example, U.S. Pat. No. 2,931,119, shows lugs or studs (items 28 and 30 in the figures of the patent) which are molded into an emblem.

The automobile industry is utilizing decorative emblems which are flexible and which have an adhesive backing to permit adherence of the emblem to an automobile surface while conforming to surface variations. An example of a flexible decorative emblem is shown in U.S. Pat. No. 4,556,588. The flexible plastic emblems, due to their manufacturing technique, did not include locator lugs. Accordingly, accurate positioning of the emblem is difficult to attain.

SUMMARY OF THE INVENTION

According to a preferred embodiment of the present invention, a method of forming a decorative emblem is disclosed which includes steps for providing locator lugs on a back surface of the emblem. The method includes the steps of forming a decorative emblem having a decorative front surface and an opposite back surface. A mold is disposed against the back surface with the mold having cavities positioned against desired locator lug positions. The cavities are shaped to conform with the desired shape of a locator lug. A flowable plastic material is applied into the cavities with the material selected to set to a hardened state and adhere to the back surface. The material is set within the mold until the material hardens and adheres to the back surface. After hardening of the material, the mold is removed from the back surface.

BRIEF DESCRIPTION OF THE DRAWINGS

FIG. 1 is a perspective exploded view of an assembly utilizing the method of the present invention;

FIG. 2 is a cross-section view showing positioning of a mold against a decorative emblem;

FIG. 3 is the view of FIG. 2 showing a lug material injected into the mold;

FIG. 4 is the view of FIG. 2 showing the mold removed from the completed lug; and FIG. 5 is the view of FIG. 3 showing an alternate embodiment.

DESCRIPTION OF THE PREFERRED EMBODIMENT

Referring now to several drawing figures in which several identical elements are numbered identically throughout, a description of a preferred embodiment of the present invention will now be provided.

With initial reference to FIG. 1, a plurality of decorative emblems 10 are shown disposed on a common releasable backing sheet 12. Each of emblems 10 is identical and a description of one will suffice as a description of the others.

Emblem 10 includes a front surface of clear plastic material 14 (such as polyester or polycarbonate) which presents an emblem front surface 15. The back surface of the polyester material 14 has an applied layer 16 of a screen printed graphic or ink. The ink layer 16 can be used to present a manufacturer's trademark or other decorative symbol which is viewed through the clear plastic 14. An adhesive layer 18 is placed over the back surface of the emblem 10 to cover the ink layer 16 and any non-inked portion of the polyester layer 14. As shown in the figures, the adhesive layer 18 is provided with a plurality of holes 20 therethrough which correspond with desired positions for locator lugs, as will be described.

Backing sheet 12 is placed over the adhesive layer 18. Sheet 12 is preferably a silicon treated polyester or paper sheet which permits the emblem 10 and its adhesive to peel away from the sheet 12. Holes 13 are formed through the sheet 12 at diameters equal to those of holes 20. The holes 13 are positioned concentric with holes 20. Alternative to separate sheets 12 and 18, adhesives may be pre-applied to backing sheet 12.

A mold 22 is provided and preferably formed of silicon or Teflon-lined aluminum (or other material which will not adhere to a lug material as will be described). Mold 22 is provided with a plurality of cavities 24. Each of cavities 24 is shaped to conform with the desired shape of a locator lug 30. The cavities 24 are positioned for the mold 22 to be placed against the backing sheet 12 with the cavities 24 generally coaxially aligned with the holes 13 and 20.

In the method of the present invention, a nozzle 26 connected to a source (not shown) of a flowable lug material is positioned over each of cavities 24. A preferable lug material is polyurethane. The flowable urethane is injected into each cavity 24.

The urethane flows into the cavity 24 and flows through the holes 13,20 formed in the backing sheet 12 and the adhesive layer 18 for the urethane to become in contact with a rear surface of the emblem 10 (with the urethane in contact with either the ink layer 16, or the plastic layer 14). The urethane is permitted to harden over time. Simultaneous with its hardening, the urethane bonds to the emblem 10. After the urethane has bonded, the mold is removed to leave a plurality of locator lugs 30 adhered to a back surface of the emblem 10.

With best reference to FIGS. 2-4, it will be appreciated that the thickness of the layers 12,18 is extremely thin. For example, the adhesive layer 18 has a thickness of about 0.002 to 0.005 inches. The thickness of the releasable backing sheet 12 is about 0.002 to 0.005 inches. With such thicknesses, urethane flows into the cavities 24 without flowing between the mold 22 and the adhesive layer 18. Accordingly, the urethane layer will not contact or bond to the release liner 12. If thick adhesive layers are used, it is desirable to prevent flow of urethane from becoming in contact with the release liner. In such cases, a modified mold 22' such as that shown in FIG. 5 is preferred. In the modified mold 22' an annular lip 34 is provided surrounding each of cavities 24 with the lip 34 sized to extend from the mold 22' to the emblem 10 and block flow of urethane from the cavity 24 to the release liner 12.

Through the foregoing description of the preferred embodiment, the invention has been shown in use with a flexible emblem of plastic having an inked surface. It will be appreciated that the method of the present invention can be utilized with any emblem having a back surface against which a flowable lug material can bond.

The foregoing has described the method of the present invention of a polyester material 14 with applied ink layer 16. It will be appreciated that the present invention is not intended to be so limited. Instead, the method could be used with a wide variety of substrate materials including vinyl, polyester, polycarbonate, acrylic, ABS material or aluminum. The particular material controls the location of the decoration. For example, with polyester, ink is applied to the back surfaces. With aluminum, ink or other decoration is on the front surfaces and the lugs are molded on the back.

From the foregoing detailed description of the present invention, it has been shown how the invention has been attained in a preferred manner. However, modifications and equivalents of the disclosed concepts such as those readily occur to those skilled in the art are intended to be included within the scope of this invention. Thus, the scope of this invention is intended to be limited only by the scope of the claims as are, or may hereafter be, appended hereto.

What is claimed is:

1. A method of forming a decorative emblem having at least one locator lug, said method comprising the steps of:

forming a decorative emblem having a finish front surface and an opposite back surface;

positioning a mold opposing said back surface with said mold having at least one cavity formed therethrough, said cavity positioned against a desired locator lug position on said back surface, said cavity shaped to conform with a desired shape of a locator lug;

applying a flowable plastic material into said cavity with said material selected to set to a hardened state and adhere to said back surface; setting said material in said mold cavity until said material hardens and adheres to said back surface;

removing said mold from said emblem; and applying a layer of an adhesive to said back surface before positioning said mold, said layer of adhesive having a gap positioned at said locator lug position.

2. A method of forming a decorative emblem having at least one locator lug, said method comprising the steps of:

forming a decorative emblem having a finish front surface and an opposite back surface;

positioning a mold opposing said back surface with said mold having at least one cavity formed therethrough, said cavity positioned against a desired locator lug position on said back surface, said cavity shaped to conform with a desired shape of a locator lug;

applying a flowable plastic material into said cavity with said material selected to set to a hardened state and adhere to said back surface; setting said material in said mold cavity until said material hardens and adheres to said back surface;

removing said mold from said emblem;

applying a layer of an adhesive to said back surface before positioning said mold, said layer of adhesive having a gap positioned at said locator lug position; and applying a removable backing sheet to cover said layer of adhesive before positioning said mold, said backing sheet having an opening formed therethrough and positioned to expose said back surface at said desired locator lug position 3. A method of forming a decorative emblem having at least one locator lug, said method comprising the steps of:

forming a decorative emblem having a finish front surface and an opposite back surface;

positioning a mold opposing said back surface with said mold having at least one cavity formed therethrough, said cavity positioned against a desired locator lug position on said back surface, said cavity shaped to conform with a desired shape of a locator lug;

applying a flowable plastic material into said cavity with said material selected to set to a hardened state and adhere to said back surface; setting said material in said mold cavity until said material hardens and adheres to said back surface;

removing said mold from said emblem; and applying an adhesive and releasable backing sheet to said back surface before positioning said mold, said adhesive and backing sheet having a hole extending therethrough and aligned with said desired locator lug position.

4. A method according to claim 1 comprising dam means for blocking flow of said lug material from said cavity to said backing sheet.

* * * * *

UNITED STATES PATENT AND TRADEMARK OFFICE
CERTIFICATE OF CORRECTION

PATENT NO. : 5,116,445

DATED : May 26, 1992

INVENTOR(S) : John I. Doughty and Darrell W. Blauer

It is certified that error appears in the above-identified patent and that said Letters Patent is hereby corrected as shown below:

At col. 4, claim 4, line 51 insert --further-- after the words "claim 1"

At col. 4, lines 51-52, delete "dam means for" after the word "comprising"

At col. 4, line 52, insert --the-- after the word "blocking"

At col. 4, claim 2, line 28, insert --.-- after the word "position"

Signed and Sealed this

Eighteenth Day of January, 1994

Attest:

BRUCE LEHMAN

Attesting Officer   Commissioner of Patents and Trademarks